US012366282B2

(12) United States Patent
Schillinger et al.

(10) Patent No.: US 12,366,282 B2
(45) Date of Patent: Jul. 22, 2025

(54) GEAR MOTOR INCLUDING AN ELECTRIC MOTOR AND A GEARBOX

(71) Applicant: SEW-EURODRIVE GMBH & CO. KG, Bruchsal (DE)

(72) Inventors: Jens Schillinger, Rastatt (DE); Sven Wurzer, Graben-Neudorf (DE); Stefan Hannet, Schwetzingen (DE); Markus Lutz, Oberhausen-Rheinhausen (DE); Markus Wöppermann, Karlsbad (DE); Philipp Abele, Hirschberg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/708,695

(22) PCT Filed: Nov. 2, 2022

(86) PCT No.: PCT/EP2022/080605
§ 371 (c)(1),
(2) Date: May 9, 2024

(87) PCT Pub. No.: WO2023/083669
PCT Pub. Date: May 19, 2023

(65) Prior Publication Data
US 2024/0418241 A1    Dec. 19, 2024

(30) Foreign Application Priority Data
Nov. 9, 2021    (DE) .......................... 102021005553.5

(51) Int. Cl.
F16H 1/28       (2006.01)
F16H 57/023     (2012.01)
(Continued)

(52) U.S. Cl.
CPC ............. *F16H 1/28* (2013.01); *F16H 57/023* (2013.01); *F16H 57/0464* (2013.01); *F16H 57/0486* (2013.01); *F16H 2057/02034* (2013.01)

(58) Field of Classification Search
CPC ............. F16H 2057/02034; F16H 1/28; F16H 57/023; F16H 57/0464; F16H 57/025; F16H 57/0486; F16H 57/021; H02K 5/173
See application file for complete search history.

(56) References Cited

U.S. PATENT DOCUMENTS

| 5,791,191 A | 8/1998 | Wittenstein | |
| 2017/0051817 A1* | 2/2017 | Maruyama | F16H 57/04 |
| 2022/0368194 A1* | 11/2022 | Tegeltija | H02K 7/003 |

FOREIGN PATENT DOCUMENTS

| DE | 2347523 B1 | 3/1975 |
| DE | 3502015 A1 | 7/1986 |

(Continued)

OTHER PUBLICATIONS

International Search Report issued in corresponding International Application No. PCT/EP2022/080605 dated Jan. 18, 2023, pp. 1-3, English Translation.

(Continued)

Primary Examiner — Stacey A Fluhart
(74) Attorney, Agent, or Firm — Carter, DeLuca & Farrell LLP

(57) ABSTRACT

A gear motor includes an electric motor and a gearbox. The electric motor has a stator housing, a rotor shaft, and a first bearing for mounting the rotor shaft. A coupling sleeve is fitted onto the rotor shaft and is connected to the rotor shaft for conjoint rotation. An inner ring of a second bearing, e.g., a roller bearing, a ball bearing, etc., is fitted onto the coupling sleeve, and the outer ring of the second bearing is (Continued)

accommodated in an adapter ring which is connected to a housing part of the gearbox for conjoint rotation. The adapter ring is connected, on the side thereof facing away from the housing part, to an annular circular flange which is connected, on the side thereof facing away from the adapter ring, to a circular flange connected to the stator housing.

24 Claims, 5 Drawing Sheets

(51) Int. Cl.
*F16H 57/04* (2010.01)
*F16H 57/02* (2012.01)

(56) References Cited

FOREIGN PATENT DOCUMENTS

| DE | 4401164 A1 | 7/1995 | |
|---|---|---|---|
| DE | 10312941 A1 | 12/2004 | |
| DE | 102017009863 A1 * | 5/2018 | ............... F16D 1/04 |
| JP | 7234618 B2 * | 3/2023 | |

OTHER PUBLICATIONS

International Report on Patentability issued in corresponding International Application No. PCT/EP2022/080605, dated May 2, 2024, pp. 1-8, English Translation.

Office Action issued by the European Patent Office on May 23, 2025 in corresponding EP Patent Application No. 22812611.6, with English Translation.

* cited by examiner

GEAR MOTOR INCLUDING AN ELECTRIC MOTOR AND A GEARBOX

FIELD OF THE INVENTION

The present invention relates to a gear motor an electric motor and a gearbox.

BACKGROUND INFORMATION

In certain conventional systems, a gear motor has a gearbox that can be driven by an electric motor.

A kit for a series of gear motors is described in German Patent Document No. 103 12 941.

SUMMARY

Example embodiments of the present invention provide a gear motor which is readily produced.

According to example embodiments, a gear motor has an electric motor and a gearbox. The electric motor has a stator housing, a rotor shaft, and a first bearing, e.g., a rolling bearing, a ball bearing, etc., for mounting the rotor shaft. A coupling sleeve is fitted onto the rotor shaft and is connected to the rotor shaft for conjoint rotation. An inner ring of a second bearing, e.g., a roller bearing, a ball bearing, etc., is fitted onto the coupling sleeve, and the outer ring of the second bearing is accommodated in an adapter ring which is connected to a housing part of the gearbox for conjoint rotation. The adapter ring is connected, on the side thereof facing away from the housing part, to an annular circular flange which is connected, on the side thereof facing away from the adapter ring, to a circular flange connected to the stator housing.

Thus, ready manufacture is possible. For example, direct attachment of the motor to the gearbox is possible, so that the input-side bearing of the gearbox can also be used as a second bearing for the rotor shaft. This makes it possible to produce a particularly compact gear motor. Furthermore, the power dissipation can be reduced since fewer bearings are required. A disadvantage is that the rotor shaft cannot yet be fully mounted when the electric motor is manufactured. However, this disadvantage can be remedied by using a plain bearing bush acting as a temporary bearing. This means that a functional test of the electric motor not yet attached to the gearbox can also be carried out during assembly. After attachment to the gearbox, the plain bearing bush can wear out during operation of the electric motor or at least lose its mounting function and thus prevent the generation of power dissipation.

According to example embodiments, the rotor shaft is mounted via the first and second bearing, e.g., during operation, i.e., after the electric motor has been attached to the gearbox. Thus, stable, resilient mounting is available during operation, and the rotor shaft can be mounted beforehand at least via the first bearing and the plain bearing bush.

According to example embodiments, a sun gear of the gearbox has a pin-like extension that is fitted into the coupling sleeve, and the sun gear is connected to the coupling sleeve for conjoint rotation. Thus, the sun gear as the input gear of the gearbox can also be mounted together with the rotor shaft. Further bearings are thus unnecessary.

According to example embodiments, the first bearing is arranged as a fixed bearing. Thus, the rotor shaft is allowed to have thermal extensions in the region of the second bearing and movements relative to the coupling sleeve and/or the second bearing are also permitted in the axial direction. In this respect, the rotor shaft is already loosely mounted in the region of the second bearing via the plain bearing bush.

According to example embodiments, the sun gear is arranged at a distance from the rotor shaft, and lubricant, e.g., lubricating grease, is arranged in the spatial region between the sun gear and the rotor shaft. The spatial region is delimited by the coupling sleeve, the sun gear, and the rotor shaft. Thus, the rotor shaft can grow axially due to thermal conditions and can even be displaced relative to the coupling sleeve. Noise and wear are nevertheless prevented. This is because the lubricant supply of the spatial region makes it possible to lubricate the toothing of the rotor shaft. A sealing ring, e.g., an O-ring, is arranged on the side facing away from the spatial region to prevent lubricant from escaping into the inner spatial region of the electric motor. Operational safety is thus achieved and both the sun gear and the rotor shaft can be mounted via the coupling sleeve and the second bearing. The configuration of the gear motor is thus compact and yet cost-effective to implement.

According to example embodiments, the sun gear is connected to the coupling sleeve in a form-fitting manner in the circumferential direction. For example, the sun gear has a toothing which is pressed and cut into the material of the coupling sleeve. Thus, the sun gear is at a distance from the rotor shaft and nevertheless the sun gear can be mounted together with the rotor shaft via the coupling sleeve and the second bearing.

According to example embodiments, the rotor shaft is connected to the coupling sleeve in a form-fitting manner in the circumferential direction. For example, the coupling sleeve has a toothing which is pressed and cut or reformed into the material of the coupling sleeve. Thus, the coupling sleeve can be connected for conjoint rotation via splines and, in addition, the second bearing acts as a bearing despite its distance from the rotor shaft.

According to example embodiments, a sealing ring, e.g., an O-ring, is fitted onto the rotor shaft between the rotor shaft and the coupling sleeve, e.g., on the side of the connection region between the rotor shaft and the coupling sleeve facing away from the sun gear, which O-ring seals towards the coupling sleeve and/or rests against the coupling sleeve and pre-centers the rotor shaft, e.g., such that no lubricant can get from the spatial region into the interior of the electric motor and/or such that the sealing ring seals the spatial region towards the interior of the electric motor. Thus, the interior of the electric motor is protected from lubricant leakage.

According to example embodiments, a plain bearing bush is fitted onto the rotor shaft, which plain bearing bush is pressed and/or glued into a bore of the square flange, e.g., for auxiliary mounting of the rotor shaft during assembly, i.e., when the second bearing is still missing and/or when there is yet no mounting by the second bearing. An annular gap is present between the plain bearing bush and the rotor shaft, so that during operation or at least after an initial period of time has elapsed during operation, mounting of the rotor shaft by the first and second bearing, e.g., ball bearing, prevents frictional contact between the rotor shaft and the plain bearing bush. Thus, a temporary mounting of the rotor shaft can be carried out for a functional test during assembly without the gearbox being attached and thus without the second bearing being present. In addition, the inertia of the rotor shaft is as low as possible.

Alternatively, a plain bearing bush is fitted onto the rotor shaft, which plain bearing bush projects into a bore of a square flange, e.g., for auxiliary mounting of the rotor shaft during assembly, i.e., for example, when the second bearing is still missing and/or when there is yet no mounting by the second bearing. An annular gap is present between the plain bearing bush and the bore of the square flange, e.g., such that mounting of the rotor shaft by the first and second bearing, e.g., ball bearing, prevents frictional contact between the rotor shaft and the plain bearing bush. Thus, the moment of inertia is increased by the mass of the plain bearing bush and provides for smoother operation of the rotor shaft. If the two bearings are not yet installed, emergency mounting or auxiliary mounting is available via the plain bearing bush.

According to example embodiments, the sun gear meshes with planet gears, which mesh with a hollow toothing of the housing part. For example, the planet gears are rotationally mounted on bolts which are firmly connected to a planet carrier, e.g., which is connected for conjoint rotation to the output shaft or acts as the output shaft. Thus, the gearbox is coaxial. Thus, no shear force is introduced via the sun gear. As a result, the rotor shaft can be stably mounted via the second bearing and is not subjected to shear forces from the side of the sun gear, e.g., and/or is not made to wobble.

According to example embodiments, a shaft seal ring is accommodated in the adapter ring, which seals towards the coupling sleeve. Thus, the coupling sleeve is not only mounted in the adapter ring via the second bearing, but is also sealed via the shaft seal ring. Alternatively, a labyrinth seal, which closes the interior of the gearbox in the event of grease lubrication, can be provided instead of the shaft seal ring.

According to example embodiments, the plain bearing bush is made of a plain bearing material, e.g., plastic. Thus, a plain bearing is readily produced.

According to example embodiments, the coupling sleeve is made of steel. Thus, a high torque can be transmitted.

According to example embodiments, the outer circumference of the square flange is cuboidal and/or has a discrete rotational symmetry. Thus, the square flange can be adapted to the stator housing of the electric motor, which stator housing is also cuboidal and/or has a discrete rotational symmetry. An interface to the circular flange can thus be provided in the square flange and does not have to be provided on the stator housing.

According to example embodiments, the outer circumference of the circular flange is round, circular, and/or has a discrete rotational symmetry. Thus, the circular flange can be adapted to the gearbox shape of the coaxial gearbox. The interface to the square flange can thus be provided in the circular flange and does not have to be provided in the gearbox.

According to example embodiments, the shaft seal ring, the adapter ring, the housing part, the output shaft, and a further shaft seal ring, which is accommodated in the housing part and seals towards the output shaft, delimit and, for example, seal the interior of the gearbox, which is at least partially filled with lubricating oil. Thus, tightness is produced both towards the environment and towards the engine. Alternatively, a labyrinth seal, which, for example, seals, e.g., in the event of grease lubrication, can be provided instead of the shaft seal ring.

According to example embodiments, the region covered by the second bearing in the axial direction, e.g., in relation to the axis of rotation of the rotor shaft, overlaps at least partially with the region covered by the toothing of the coupling sleeve in the axial direction. For example, the regions are at a distance from the plain bearing bush in the axial direction. Thus, the rotor shaft can be mounted as stably as possible so that vibrations of the rotor shaft are avoided during operation. Furthermore, auxiliary mounting is made possible via the plain bearing bush during the production of the motor. Thus, the electric motor can already be operated before the gearbox including the adapter ring, second bearing, e.g., and clutch sleeve are attached.

Further features and aspects of example embodiments of the present invention are explained in more detail below with reference to the appended schematic Figures.

DETAILED DESCRIPTION

Figure 1:
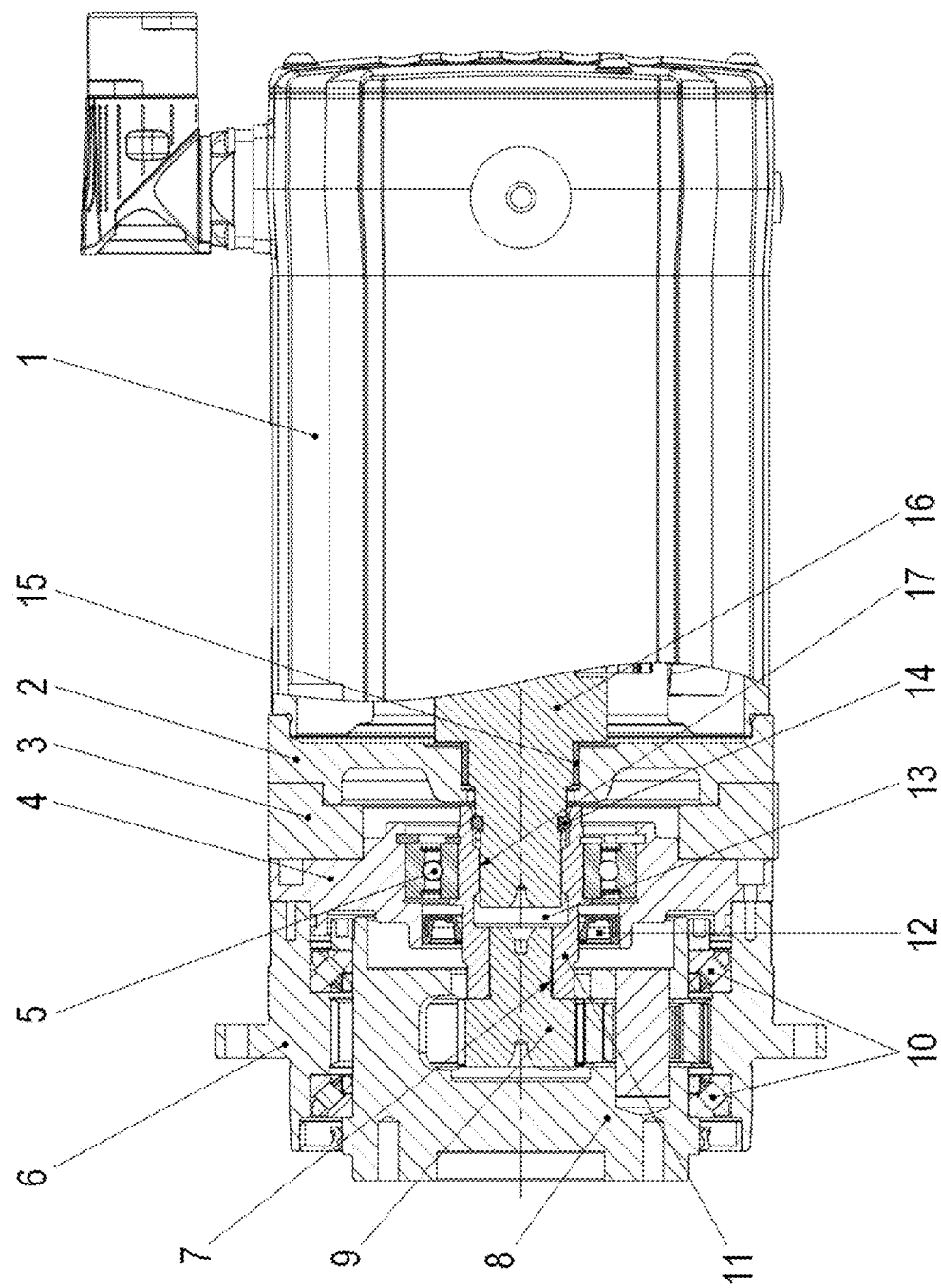
FIG. 1 is a cross-sectional view of a gear motor having a gearbox driven by an electric motor.
Figure 2:
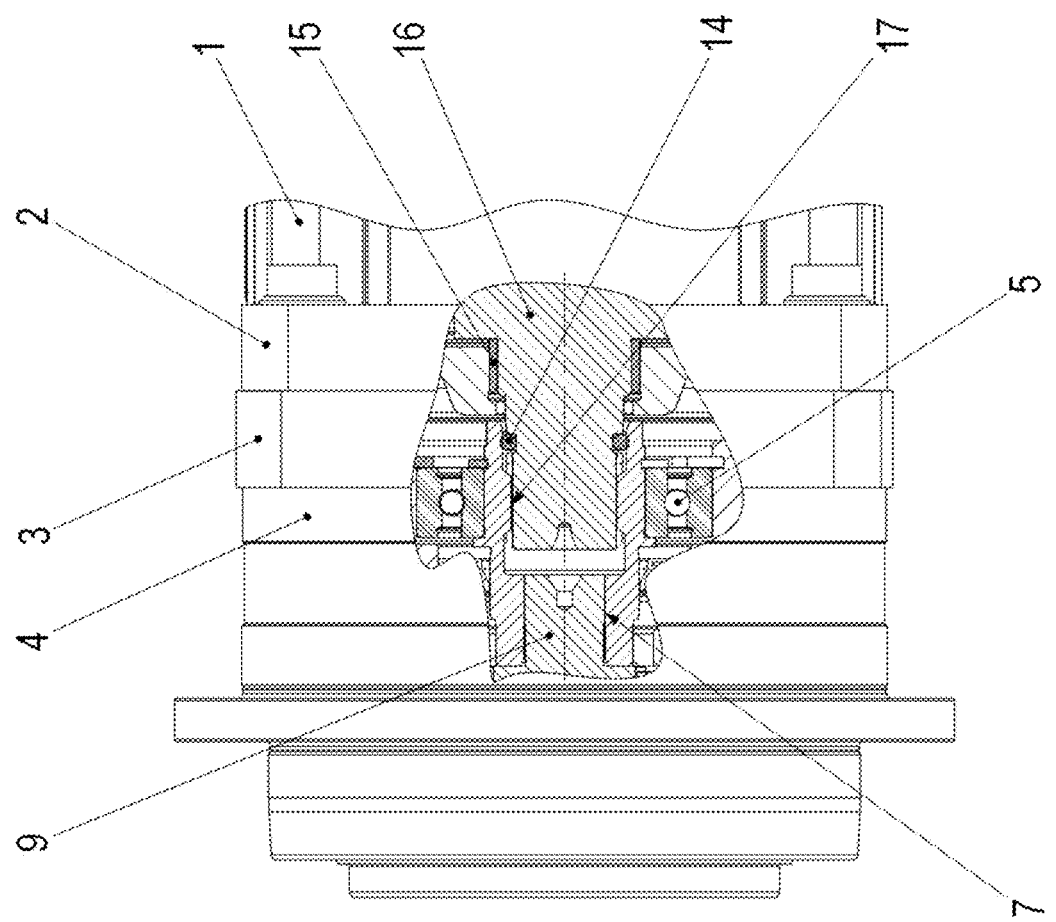
FIG. 2 is an enlarged cross-sectional view.
Figure 3:
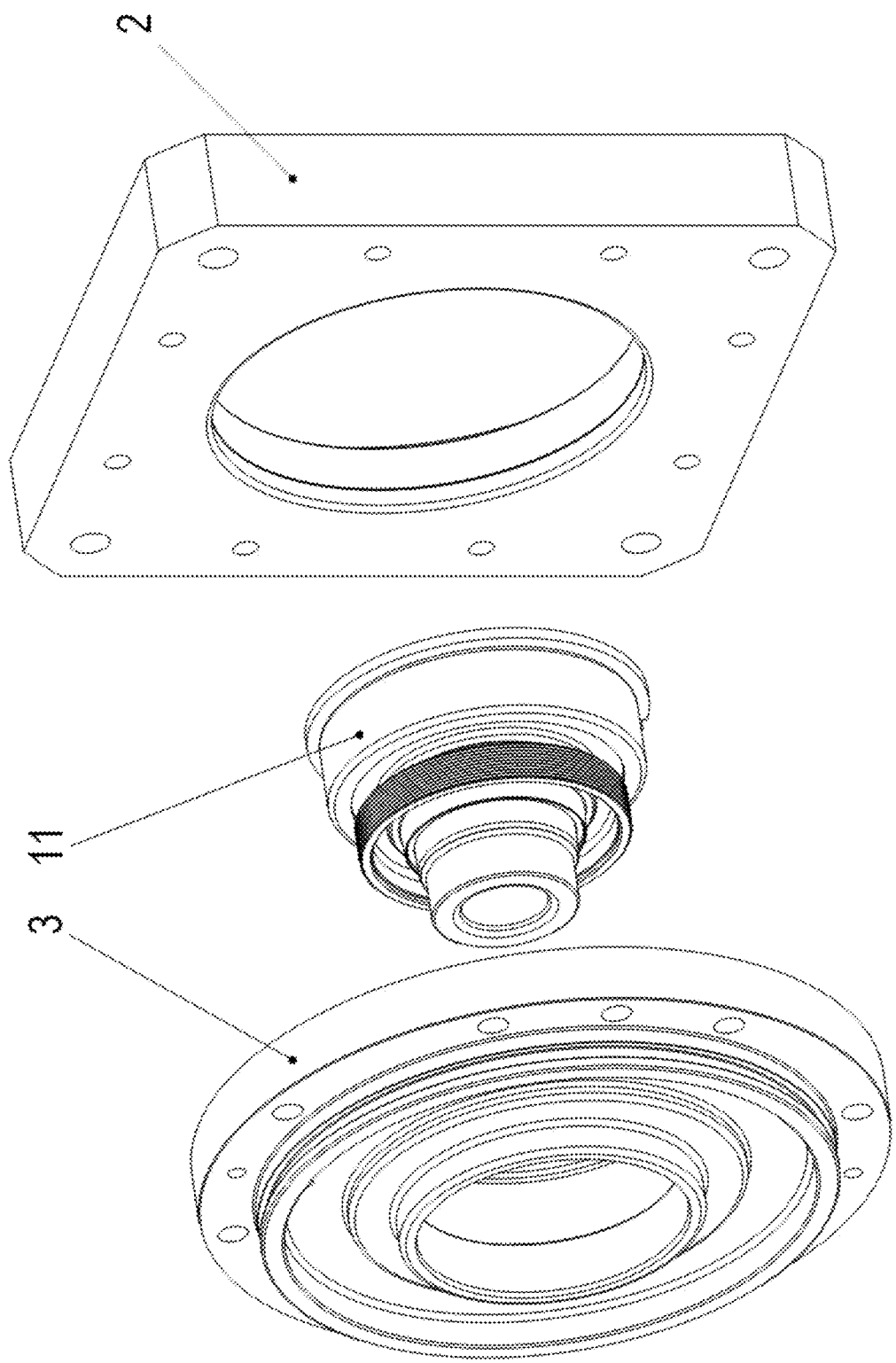
FIG. 3 is a perspective view of a square flange 2 and a circular flange 3.
Figure 4:
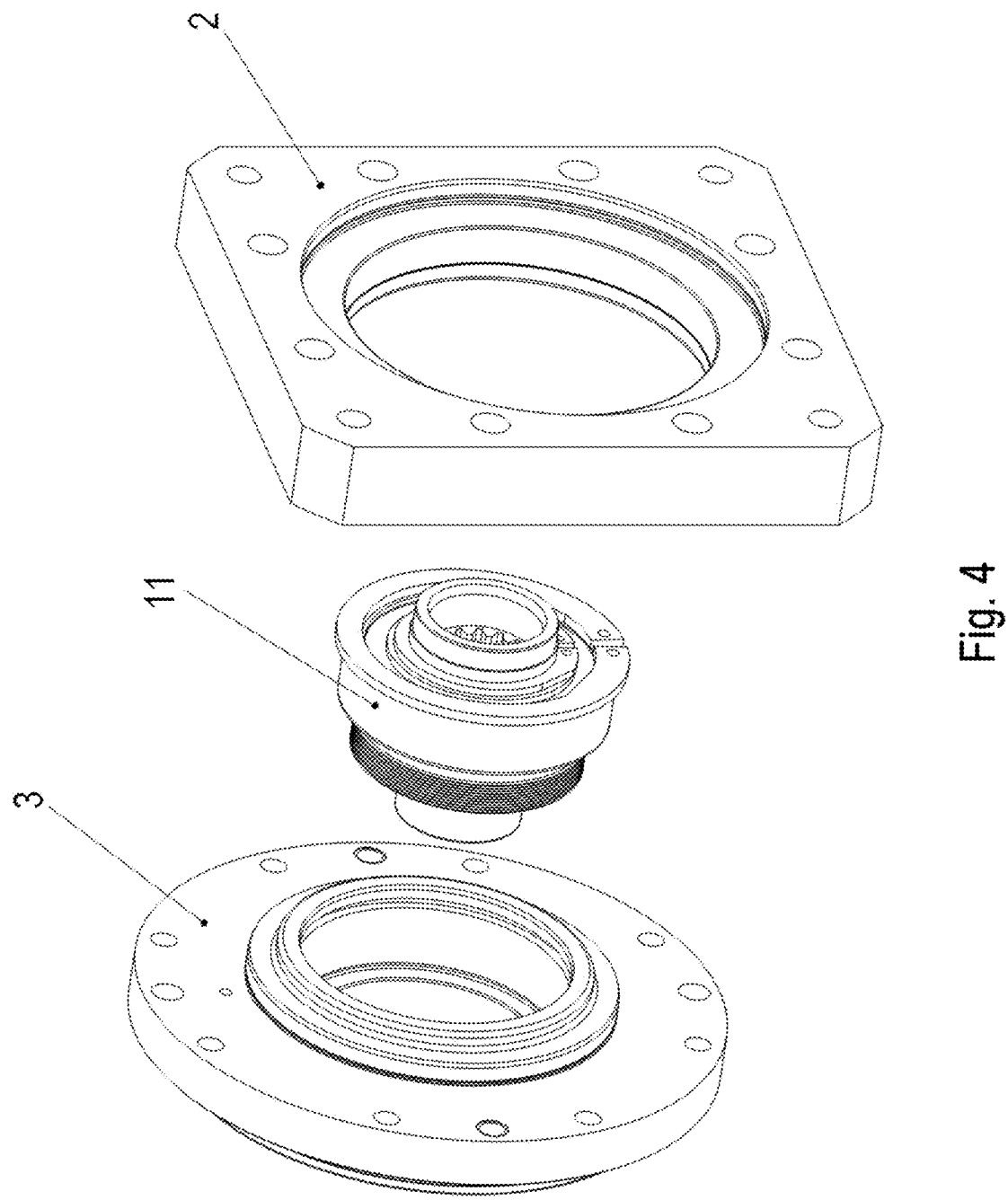
FIG. 4 illustrates the two flanges from a different perspective.

As illustrated in the Figures, the gear motor has an electric motor which is connected via a square flange 2, which is connected to the, e.g., substantially cuboid, stator housing 1 of the electric motor, and a circular flange 3, which is connected, on the one hand, to an adapter ring 4, which is connected to a housing part 6 of the gearbox, and, on the other hand, to the square flange 3.

The gearbox is arranged as a coaxial gearbox, e.g., as a planetary gearbox.

The rotor shaft 16 of the electric motor is rotatably mounted via a first bearing, which is accommodated in the stator housing 1, and is indirectly rotatably mounted via a second bearing 5.

The first bearing is, for example, arranged as a fixed bearing.

The second bearing 5 is accommodated in an adapter ring 4, which is arranged between the circular flange 3 and the housing part 6.

The inner ring of the second bearing 5 is fitted onto a coupling sleeve 11, into which the rotor shaft 16 is fitted and into which a sun gear 9 is fitted.

For this purpose, the rotor shaft has a toothing 17, e.g., splines, which is fitted into an internal toothing of the coupling sleeve 11, so that the rotor shaft 16 is connected to the coupling sleeve 11 in a form-fitting manner in the circumferential direction, i.e., for example, connected for conjoint rotation.

In addition, the sun gear 9 is fitted with its toothing 7, e.g., splines, into a further internal cylindrical bore of the coupling sleeve 11. When fitted in, the toothing 7 cuts into the material of the coupling sleeve 11, so that the sun gear 9 is connected to the coupling sleeve 11 in a form-fitting manner in the circumferential direction, i.e., for example, is connected for conjoint rotation.

The sun gear 9 is at a distance from the rotor shaft 16, so that a spatial region for lubricant is enclosed by the coupling sleeve 11. Since this spatial region is delimited by the coupling sleeve 11, the sun gear 9, and the rotor shaft 16, the meshing region of the toothing 17 is also affected by the lubricant.

A shaft seal ring 12, which seals towards the coupling sleeve, is accommodated in the adapter ring 4. For this purpose, the coupling sleeve has a sealing surface which touches a seal lip of the shaft seal ring 12. The sealing surface is, for example, finely machined and cylindrical.

The rotor shaft 16 projects through a bore in the square flange. A plain bearing bush 15, which is, for example, made of plastic and/or formed as a hollow cylinder, is accommodated in the bore. The rotor shaft 16 projects through the hollow plain bearing bush 15. In this manner, emergency mounting of the rotor shaft is provided via the plain bearing bush 15 for assembly purposes. This is because as long as the electric motor is not yet attached to the gearbox and the coupling sleeve 11 is not plugged into the rotor shaft 16, the plain bearing bush 15 assumes the mounting function for the rotor shaft 16. Once the coupling sleeve 11 has been fitted onto the rotor shaft 16 and the coupling sleeve has been fitted into the bearing 5 accommodated in the adapter ring 4, the bearing 5 assumes the mounting function and the plain bearing bush 15 is no longer required.

Since the sun gear 9 is also fitted into the coupling sleeve 11 with the toothing 7 provided on the pin-like extension of the sun gear 9 and is thus connected for conjoint rotation, the sun gear 9 is mounted for rotation via the bearing 5.

The sun gear 9 meshes with planet gears, which are rotatably mounted on bolts that are fitted into a planet carrier, which is connected for conjoint rotation with the output shaft 8 or is arranged as a single piece.

The output shaft 8 is rotatably mounted via bearings accommodated in a housing part 6.

The housing part 6 of the gearbox is rounded on its outer circumference so that the gearbox is arranged as a coaxial gearbox.

The stator housing part 1 has a cuboid shape and is connected to the square flange 2, which also has a substantially cuboid outer circumference. The circular flange 3 connected to the housing part 6 of the gearbox is rounded to correspond to the housing part 6.

Both the square flange 2 and the circular flange 3 have a bore that passes through axially, so that a connecting screw can be passed through and screwed into a threaded bore in the adapter ring 4. Alternatively, however, the adapter ring 4 also has a bore that passes through axially, so that the connecting screw can be passed through and screwed into a threaded bore in the housing part 6. In this manner, the two flanges (2, 3) and the adapter ring 4 are pressed towards the housing part 6 by the screw head of the screw resting on the square flange 2 and thus held together.

The toothing 7 of the sun gear 9 has a maximum outer diameter which has a smaller value than the clear inner diameter of the coupling sleeve 11 in the axial region covered by the toothing 17 and/or than the value of the largest maximum outer diameter of the toothing 17 of the rotor shaft 16.

According to example embodiments, the coupling sleeve has internal toothing in the axial region covered by the toothing 17 and the rotor shaft is cylindrical, i.e., without the toothing 17. In this case, the toothing of the coupling sleeve 11 cuts into the rotor shaft 16 when the coupling sleeve 11 is fitted onto the rotor shaft 16.

The plain bearing bush 15 is axially delimited towards the engine by a shaft step formed on the rotor shaft 16 and towards the gearbox by a step formed on the bore which accommodates the plain bearing bush 15.

A sealing ring 14, e.g., an O-ring, is fitted onto the rotor shaft 16 and rests against the coupling sleeve 11. The sealing ring 14 thus seals towards the coupling sleeve 11. The sealing ring 14 is axially delimited by a step formed on the rotor shaft 16.

According to example embodiments, instead of the toothing 17, e.g., splines, a force-locking connection is provided, for example, a cylindrical end of the rotor shaft is pressed into the coupling sleeve. The toothing 7, e.g., the splines, can also be replaced by a force-locking connection. Although production with less effort is thus possible, only a lower torque can be safely transmitted, since the force-locking connection, i.e., the form-fitting connection mediated by the splines has a lower load-bearing capacity.

The adapter ring 4 has a centering collar extending around in the circumferential direction in relation to the axis of rotation of the rotor shaft 16, against which centering collar the radial inner wall, i.e., the wall of a bore, of the circular flange 3 rests.

The square flange 2 also a centering collar extending around in the circumferential direction, against which centering collar the radial inner wall, i.e., the wall of a bore, of the circular flange 3 rests.

The adapter ring and the two flanges (2, 3) can be used to create a modular system. This is because a large number of variants can be provided with a small number of different sized electric motors and gearboxes.

Figure 5:
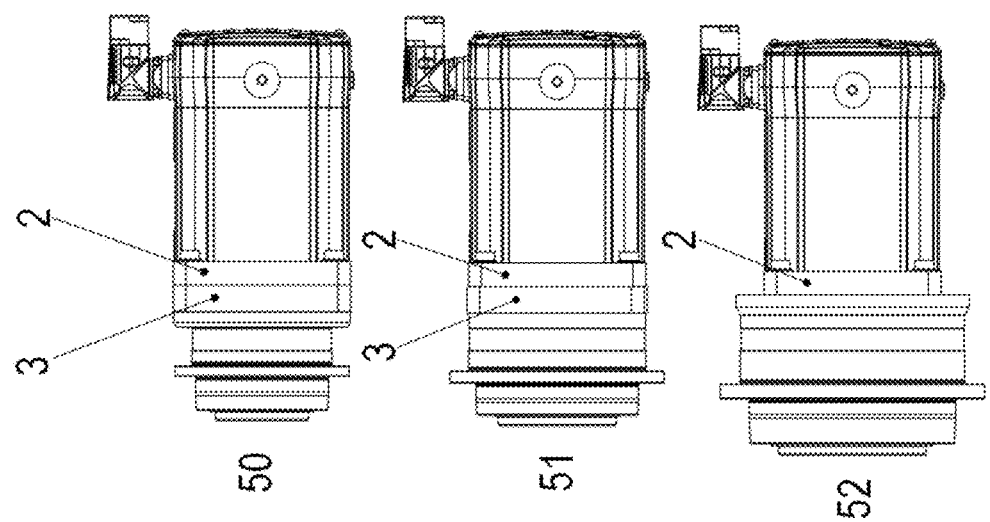
FIG. 5 schematically illustrates a series of gear motors.

In this respect, FIG. 5 illustrates three gear motors (50, 51, 52), which differ in that gearboxes of different sizes can be driven by the same electric motor and the connection is implemented via suitable dimensioning and selection of the adapter ring 4 and the two flanges (2, 3).

For example, the gearbox is a planetary gearbox, which is why the sun gear 9 meshes with several planet gears arranged evenly around the circumference. Thus, substantially no shear force is created. For this reason, the sun gear 9 does not deflect the clutch sleeve 11, but provides additional stabilization. This results in smoother running of the rotor shaft 16, which would otherwise be poorly mounted by the bearing 5 depending on a wobbling coupling sleeve 11.

This is because the bearing 5 is at a distance from the rotor shaft 16 and only performs the mounting function via the interposed coupling sleeve 11.

The circumferential direction, radial direction, and axial direction are always related to the axis of rotation of the rotor shaft 16 and/or of the sun gear 9 and/or of the output shaft 8.

According to example embodiments, the rotor shaft 16 is fitted with its toothing 17 into an inner cylindrical bore of the coupling sleeve 11, and the toothing 17 is cut into the material of the coupling sleeve 11 when the rotor shaft 16 is fitted, so that the rotor shaft 16 is connected to the 10 coupling sleeve 11 in a form-fitting manner in the circumferential direction, i.e., for example, connected for conjoint rotation.

LIST OF REFERENCE NUMERALS

1 Stator housing
2 Square flange
3 Circular flange
4 Adapter ring
5 Bearing
6 Housing part, e.g., with ring gear or hollow toothing
7 Toothing, e.g., splines
8 Output shaft
9 Sun gear
10 Bearing, e.g., angular contact bearing
11 Coupling sleeve
12 Shaft seal ring
13 Lubricant, e.g., lubricating grease
14 Sealing ring, e.g., O-ring
15 Plain bearing bush, e.g., hollow-cylindrical
16 Rotor shaft
17 Toothing, e.g., splines 18 Further shaft seal ring
50 First gear motor
51 Second gear motor
52 Third gear motor

The invention claimed is:

1. A gear motor, comprising:
an electric motor including a stator housing, a first bearing, and a rotor shaft mounted on the first bearing;
a gearbox including a housing part;
a coupling sleeve arranged on the rotor shaft and connected to the rotor shaft for conjoint rotation; and
a second bearing including an inner ring arranged on the coupling sleeve and an outer ring accommodated in an adapter ring connected to the housing part of the gearbox for conjoint rotation;
wherein the adapter ring is connected, on a side thereof facing away from the housing part, to a square flange that is connected, on a side thereof facing away from the adapter ring, to a circular flange connected to the stator housing;
wherein a sun gear of the gearbox has an extension that is arranged in the coupling sleeve, and the sun gear is connected to the coupling sleeve for conjoint rotation; and
wherein the sun gear is arranged at a distance from the rotor shaft, lubricant and/or lubricating grease is arranged in a spatial region between the sun gear and the rotor shaft, and the spatial region is delimited by the coupling sleeve, the sun gear, and the rotor shaft.

2. The gear motor according to claim 1, wherein the second bearing is arranged as a roller bearing and/or a ball bearing.

3. The gear motor according to claim 1, wherein the rotor shaft is mounted via the first bearing and the second bearing.

4. The gear motor according to claim 1, wherein the first bearing is arranged as a fixed bearing.

5. The gear motor according to claim 1, wherein the sun gear is connected to the coupling sleeve in a form-fitting manner in a circumferential direction and/or the sun gear has a toothing pressed and cut into a material of the coupling sleeve.

6. The gear motor according to claim 1, wherein the rotor shaft is connected to the coupling sleeve in a form-fitting manner in a circumferential direction and/or the coupling sleeve has a toothing which is pressed and cut into the material of the coupling sleeve.

7. The gear motor according to claim 1, wherein the sun gear meshes with planet gears that mesh with a hollow toothing of the housing part.

8. The gear motor according to claim 7, wherein the planet gears are rotationally mounted on bolts that are firmly connected to a planet carrier.

9. The gear motor according to claim 8, wherein the planet carrier is connected for conjoint rotation to an output shaft.

10. The gear motor according to claim 1, wherein a shaft seal ring that seals towards the coupling sleeve is accommodated in the adapter ring.

11. The gear motor according to claim 1, wherein the coupling sleeve is made of steel.

12. The gear motor according to claim 1, wherein an outer circumference of the circular flange is round, circular, and/or has a discrete rotational symmetry.

13. A gear motor, comprising:
an electric motor including a stator housing, a first bearing, and a rotor shaft mounted on the first bearing;
a gearbox including a housing part;
a coupling sleeve arranged on the rotor shaft and connected to the rotor shaft for conjoint rotation; and
a second bearing including an inner ring arranged on the coupling sleeve and an outer ring accommodated in an adapter ring connected to the housing part of the gearbox for conjoint rotation;
wherein the adapter ring is connected, on a side thereof facing away from the housing part, to a square flange that is connected, on a side thereof facing away from the adapter ring, to a circular flange connected to the stator housing;
wherein a sun gear of the gearbox has an extension that is arranged in the coupling sleeve, and the sun gear is connected to the coupling sleeve for conjoint rotation; and
wherein a sealing ring is arranged on the rotor shaft between the rotor shaft and the coupling sleeve and seals towards the coupling sleeve and/or rests against the coupling sleeve.

14. The gear motor according to claim 13, wherein the sun gear is arranged at a distance from the rotor shaft, lubricant and/or lubricating grease is arranged in a spatial region between the sun gear and the rotor shaft, and the spatial region is delimited by the coupling sleeve, the sun gear, and the rotor shaft.

15. The gear motor according to claim 13, wherein the sealing ring is arranged on the rotor shaft between the rotor shaft and the coupling sleeve on a side of a connection region between the rotor shaft and the coupling sleeve facing away from the sun gear.

16. A gear motor, comprising:
an electric motor including a stator housing, a first bearing, and a rotor shaft mounted on the first bearing;
a gearbox including a housing part;
a coupling sleeve arranged on the rotor shaft and connected to the rotor shaft for conjoint rotation; and
a second bearing including an inner ring arranged on the coupling sleeve and an outer ring accommodated in an adapter ring connected to the housing part of the gearbox for conjoint rotation;
wherein the adapter ring is connected, on a side thereof facing away from the housing part, to a square circular flange that is connected, on a side thereof facing away from the adapter ring, to a circular flange connected to the stator housing; and
wherein a plain bearing bush is arranged on the rotor shaft and is accommodated in a bore of a square flange, an annular gap being present between the plain bearing bush and the rotor shaft.

17. The gear motor according to claim 16, wherein a sun gear of the gearbox has an extension that is arranged in the coupling sleeve, and the sun gear is connected to the coupling sleeve for conjoint rotation.

18. The gear motor according to claim 16, wherein, during operation or at least after an initial period of time for wearing out the plain bearing bush has elapsed during operation, mounting of the rotor shaft by the first and second bearing prevents frictional contact between the rotor shaft and the plain bearing bush.

19. The gear motor according to claim 16, wherein the plain bearing bush is made of a plastic.

20. The gear motor according to claim 16, wherein the square flange is arranged as a cuboid and/or an outer circumference of the square flange has a discrete rotational symmetry.

21. A gear motor, comprising:
   an electric motor including a stator housing, a first bearing, and a rotor shaft mounted on the first bearing;
   a gearbox including a housing part;
   a coupling sleeve arranged on the rotor shaft and connected to the rotor shaft for conjoint rotation; and
   a second bearing including an inner ring arranged on the coupling sleeve and an outer ring accommodated in an adapter ring connected to the housing part of the gearbox for conjoint rotation;
   wherein the adapter ring is connected, on a side thereof facing away from the housing part, to a square flange that is connected, on a side thereof facing away from the adapter ring, to a circular flange connected to the stator housing; and
   wherein a plain bearing bush is arranged the rotor shaft and projects into a bore of a square flange, an annular gap being present between the plain bearing bush and the bore of the square flange.

22. The gear motor according to claim 21, wherein mounting of the rotor shaft by the first bearing and the second bearing prevents frictional contact between the rotor shaft and the plain bearing bush.

23. A gear motor, comprising:
   an electric motor including a stator housing, a first bearing, and a rotor shaft mounted on the first bearing;
   a gearbox including a housing part;
   a coupling sleeve arranged on the rotor shaft and connected to the rotor shaft for conjoint rotation; and
   a second bearing including an inner ring arranged on the coupling sleeve and an outer ring accommodated in an adapter ring connected to the housing part of the gearbox for conjoint rotation;
   wherein the adapter ring is connected, on a side thereof facing away from the housing part, to a square circular flange that is connected, on a side thereof facing away from the adapter ring, to a circular flange connected to the stator housing;
   wherein a shaft seal ring that seals towards the coupling sleeve is accommodated in the adapter ring; and
   wherein the shaft seal ring, the adapter ring, the housing part, an output shaft, and a further shaft seal ring that is accommodated in the housing part and seals towards the output shaft delimit and/or seal an interior of the gearbox that is at least partially filled with lubricating oil.

24. A gear motor, comprising:
an electric motor including a stator housing, a first bearing, and a rotor shaft mounted on the first bearing;
a gearbox including a housing part;
a coupling sleeve arranged on the rotor shaft and connected to the rotor shaft for conjoint rotation; and
a second bearing including an inner ring arranged on the coupling sleeve and an outer ring accommodated in an adapter ring connected to the housing part of the gearbox for conjoint rotation;
wherein the adapter ring is connected, on a side thereof facing away from the housing part, to a square circular flange that is connected, on a side thereof facing away from the adapter ring, to a circular flange connected to the stator housing; and
wherein a region covered by the second bearing in an axial direction overlaps at least partially with a region covered by a toothing of the coupling sleeve in the axial direction.

* * * * *